3,141,869
PROCESS FOR THE PRODUCTION OF ACRYLO-NITRILE POLYMERS
Ingofroh Dennstedt, Cologne-Buchforst, Germany, assignor to Farbenfabriken Bayer Aktiengesellschaft, Leverkusen, Germany, a corporation of Germany
No Drawing. Filed Sept. 19, 1960, Ser. No. 56,675
Claims priority, application Germany Sept. 23, 1959
1 Claim. (Cl. 260—85.5)

The present invention relates to a process for the production of acrylonitrile polymers having particularly good thermostability.

It is known to polymerise acrylonitrile in aqueous medium at pH values below 7, by itself or in admixture with other vinyl compounds, using radical formers, advantageously with Redox systems based on per compounds and sulphur compounds of low oxidation stages. The polymers obtained in this way serve for the production of shaped articles, filaments, fibres and the like. However, they frequently have a disadvantageously low thermostability, which can lead to a strong yellowing, particularly at relatively high temperatures and in the presence of air. This is particularly disadvantageous when using fibre materials produced therefrom. This phenomenon of insufficient thermostability is attributed inter alia to the presence of heavy metal ions, such as iron ions and copper ions, but also silver and manganese ions, which are incorporated therein from parts of the apparatus or due to the added ingredients, or which are also intentionally added for accelerating the polymerisation.

It has consequently already been proposed to add complex formers for the heavy metal ions, in order to reduce their harmful influence on discolouration. However, in such cases, there is such a clear reduction in the yield that the processes have no industrial importance.

It is an object of the present invention to make available such acrylonitrile polymers which show a light-coloured raw colour shade and have a good thermal stability. A further object of the present invention consists in the development of a process for the production of these acrylonitrile polymers, which operates with very short reaction times, leads to high yields and in which the excellent properties of the polymers are obtained in a simple manner. Further objects of the present invention will be apparent from the following description and the examples.

It has now been found to be possible to produce a very great acceleration of the polymerisation when producing acrylonitrile polymers, a great increase in the yield and an improvement in the thermostability of the polymers if the polymerisation of acrylonitrile, alone or together with other polymerisable vinyl compounds, is carried out in an aqueous medium at pH values below 7 with the aid of radical formers and in the presence of water-soluble, polyvalent metal salts, with or without complex formers for heavy metal salts and if necessary with addition of heavy metal ions.

The polymerisation itself is carried out in a manner known per se, taking into account the separately indicated measures. The essential feature of the invention is the addition of the salts of polyvalent metals.

It was not possible to anticipate that the polyvalent metal salts would produce such effects according to the invention.

By radical formers, there are to be understood all compounds which are able to initiate the polymerisation, such as diacyl peroxides, dialkyl peroxides, hydrogen peroxide, alkyl hydroperoxide, aryl hydroperoxide and azo compounds, such as azo diisobutyric acid nitrile. Especially suitable for the polymerisation are Redox systems, such as the system based on persulphate and sulphur compounds of low oxidation stages.

The alkali metal salts, especially the sodium and potassium salts of persulphuric acid, are suitable as per compounds. The most important sulphur compounds of a low oxidation stage are: sulphur dioxide, alkali metal pyrosulphites, alkali metal bisulphites, alkali metal thiosulphates or the corresponding ammonium salts. The alkali metal salts which are especially suitable are the sodium and potassium salts. The per compounds are used in quantities from 0.5 to 5%, preferably 1 to 2%, related to the monomers to be polymerised. The sulphur compounds of low oxidation stages are used in quantities of from 0.5 to 10%, preferably 1 to 4%, related to the monomers which are to be polymerised.

Smaller quantities of heavy metal ions can be added to the system for further activation. The heavy metal ions, which are preferably added in the form of their salts, such as sulphates, or chlorides or nitrates, comprise mainly the salts of divalent iron and copper. Generally speaking, quantities of 0.00001 to 0.1%, related to the monomers introduced are sufficient. Especially suitable as complex formers for the heavy metal ions are the alkali metal fluorides, alkali metal pyrophosphates, alkali metal hexametaphosphates, as well as the corresponding ammonium salts. The potassium and sodium salts are especially to be considered as alkali metal salts. Particularly suitable are imidotriglycolic acid and ethylene diamine tetraacetic acid. The quantity of the complex formers to be added depends on the quantity of the heavy metal ions intentionally or unintentionally introduced and present in the polymerisation system. Generally speaking, the quantity of complex formers should be far in excess of the equivalent weight of the heavy metal ions. Quantities of 0.05 to 10%, preferably 0.1 to 3%, based on the monomers to be polymerised are suitable.

Polyvalent metals to be considered are those which are able to form colourless or practically colourless ions. Included in this group are the water-soluble salts, such as chlorides, sulphates and nitrates, of calcium, magnesium, aluminium and zinc. The salts of aluminium, such as potassium-aluminium sulphate, have proved especially advantageous. These salts can be added before or during the polymerisation and the quantity to be added is in the order of magnitude of 0.5 to 20%, preferably 1 to 3%, related to the monomers introduced.

The process is suitable both for polymerising acrylonitrile by itself and for copolymerisation with other vinyl compounds, for example esters of acrylic and methacrylic acid, styrene, vinyl chloride, vinylidene chloride and vinyl acetate; it is also possible to use vinyl compounds with reactive groups, such as unsaturated amines, amides or unsaturated carboxylic acids or sulphonic acids, such as for example acrylic acid or styrene-sulphonic acid.

The polymerisation according to the invention is itself carried out in the usual manner, water serving as polymerisation medium. Advantageously 500–1000 parts by weight of water are used to 100 parts by weight of monomer and the reaction temperatures are between 30 and 70° C., advantageously between 40 and 50° C. It has proved to be especially advantageous to start the polymerisation with part of the reactants and auxiliaries and then continuously to add all constituents of the mixture.

The pH value, which is below 7 and advantageously between 1 and 3, is generally adjusted with dilute sulphuric acid, but other mineral acids can also be employed.

The polymerisation starts extremely quickly, proceeds uniformly and quickly leads to conversions which are higher than 90%. When working in the presence of alum, the polyacrylonitrile suspensions are moreover obtained in such a dispersed form that they are easy to handle, filter and purify on an industrial scale. The polymers themselves are characterised by a very light raw colour tone and by an extremely small tendency to discolouration on being heated in the presence of air.

The adjustment of the desired molecular weight of the polymers can be effected by the polymerisation temperature, by the quantity of the alum and particularly by the quantity of the radical formers.

The present invention is further disclosed in the following examples which are illustrative but not limitative thereof.

*Example 1*

180 parts by weight of water, 0.1 part by weight of sodium pyrosulphite and 4 parts by weight of a monomer mixture of 95 parts by weight of acrylonitrile and 5 parts by weight of methyl methacrylate are placed in a suitable stirrer-type vessel, the receiver is adjusted to a pH value of 2.5 with sulphuric acid and heated to 45° C. The air had previously been replaced by nitrogen.

The following solutions are then run in from five separate vessels simultaneously and while stirring, within a period of 4 hours, the temperature being kept at 45° C.:

(a) 156 parts by weight of a mixture of 95% acrylonitrile and 5% methyl methacrylate,
(b) 6.7 parts by weight of sodium pyrosulphite in 236 parts by weight of water,
(c) 2.3 parts by weight of potassium persulphate in 236 parts by weight of water,
(d) 1.6 parts by weight of sodium ethylene diamine tetraacetate in 236 parts by weight of water and adjusted with sulphuric acid to pH 7,
(e) 42 parts by weight of normal sulphuric acid and 196 parts by weight of water.

The mixture is stirred for another 2 hours, then 0.7 part by weight of sodium pyrosulphite and 0.2 part by weight of potassium persulphate, each in 50 parts by weight of water, are added and stirring is continued for another hour at 45° C.

The polymer is suction-filtered, washed several times with water and dried at 50° C. 26 parts by weight of polymer are obtained, this corresponding to a yield of 16.3%. The K-value of the polymer is 138.

As is to be seen from the example, there is obtained a low yield of polymers of high viscosity and unsuitable for spinning purposes by adding complex formers.

*Example 2*

The operation is carried out exactly as in Example 1, except that aluminium alum is also included in the solution (e) which is run in.

The solution (e) has the following compositions:
42 parts by weight of normal sulphuric acid, 104 parts by weight of water and 92 parts by weight of 5% potassium-alum-solution. The aluminium-alum has an iron content of less than 0.001%.

113 parts by weight of polymer are obtained, corresponding to a conversion of 70.6%. After another 4 hours of polymerisation, the conversion is more than 90% and the K-value of the polymer is then 99.7.

The polymerisation-accelerating effect of alum can clearly be seen from comparison of Examples 1 and 2. Whereas a conversion of only about 16% is obtained after 6 hours under the conditions of Example 1, the conversion in Example 2 after the same period of time is about 70%.

*Example 3*

The operation is carried out as in Example 1, except that the solutions which are run in have the following compositions:

(a) 156 parts by weight of monomer mixture (acrylonitrile 95%, methyl acrylate 5%),
(b) 7.2 parts by weight of sodium pyrosulphite in 236 parts by weight of water,
(c) 2.4 parts by weight of potassium persulphate in 236 parts by weight of water,
(d) 6.8 parts by weight of potassium styrene sulphonate (42.5%) in 100 parts by weight of water +1.6 parts by weight of sodium ethylene diamine tetraacetate in 136 parts by weight of water,
(e) 42 parts by weight of normal sulphuric acid +196 parts by weight of water.

The solutions of potassium styrene sulphonate and sodium ethylene diamine tetraacetate are made neutral before introduction.

72 parts by weight of polymer are obtained, this corresponding to a conversion of 45%. The K-value of the polymer is 107. The films can be dyed satisfactorily. The action of the complex formers in inhibiting polymerisation is again shown here.

*Example 4*

In this example, the operation of Example 3 is followed, but with additon of 3% of potassium alum, related to the monomer.

Consequently, the composition of the solution (e) which is run in is as follows:

4.8 parts by weight of alum in 92 parts by weight of water and 42 parts by weight of normal sulphuric acid in 104 parts by weight of water.

The batch is treated and worked up exactly in the same way as in Example 1.

147 parts by weight of polymer are obtained, corresponding to a 92% conversion, with a K-value of 90. The films can be satisfactorily dyed.

The increase in the polymerisation speed by comparison with Example 3 can clearly be seen (yield and K-value).

*Example 5*

This example demonstrates the influence of potassium-aluminium sulphate on the thermostability of the acrylonitrile polymers in batches without complex formers.

The following reagents are placed in a vessel which can be sealed:

1400 parts by weight of water, 10 parts by weight of potassium-aluminium sulphate, 2 parts by weight of sodium pyrosulphite, 95 parts by weight of acrylonitrile and 5 parts by weight of methyl acrylate. The same reagents are placed in a second sealable vessel, except that the potassium-aluminium sulphate is omitted.

Both batches are heated to 30° C., the air is replaced by nitrogen and finally 1.35 parts by weight of potassium persulphate as a 2% aqueous solution is added to both batches. The pH value is 2.5, the polymerisation temperature is kept at 30° C. Polymerisation continues for 16 hours with shaking.

Batch 1, with potassium-aluminium sulphate:
Yield 100%, K-value 90. Films which have been manufactured from the polymer become medium yellow on being heated for three hours at 173° C. in air.

Batch 2, without potassium-aluminium sulphate:
Yield 97.5%, K-value 90. Films of this polymer become yellowish-brown on being heated for 3 hours in air to 173° C.

It is apparent from these experiments that the addition of potassium-aluminium sulphate to the polymerisation batch improves the thermostability of the corresponding polymers. This application is related to co-pending application Serial No. 43,724, filed July 19, 1960.

What I claim is:

In the process of producing acrylonitrile polymers having an acrylonitrile content of at least 95% at a pH value of below 7 in an aqueous medium containing a redox catalyst system and in the presence of from about 0.1 to about 3% of a complex former for heavy metals selected from the group consisting of an alkali metal fluoride, an alkali metal pyrophosphate, an alkali metal hexametaphosphate, imidotriglycolic acid and ethylene diamine tetraacetic acid, the improvement which comprises adding to the polymerization medium from about 1–3%, calculated on the monomer content, of potassium aluminum sulfate.

References Cited in the file of this patent

UNITED STATES PATENTS

| | | |
|---|---|---|
| 2,631,142 | Williams et al. | Mar. 10, 1953 |
| 2,813,088 | Meinel | Nov. 12, 1957 |
| 2,847,405 | Mallison | Aug. 12, 1958 |
| 2,911,397 | Janssen et al. | May 3, 1959 |
| 2,974,123 | Ketterer | Mar. 7, 1961 |
| 2,982,761 | Campbell | May 2, 1961 |